United States Patent [19]

Ono et al.

[11] Patent Number: 5,206,313

[45] Date of Patent: Apr. 27, 1993

[54] PROCESS FOR PREPARING POWDER COATING COMPOSITION

[75] Inventors: Kazuya Ono, Tokyo; Mikio Osa, Saitama; Masao Kubo, Koshigaya; Katsuji Kitagawa, Kasukabe, all of Japan

[73] Assignee: Somar Corporation, Japan

[21] Appl. No.: 867,368

[22] Filed: Apr. 13, 1992

[30] Foreign Application Priority Data

Jun. 25, 1991 [JP] Japan .................................. 3-180401

[51] Int. Cl.⁵ .............................................. C08L 63/00
[52] U.S. Cl. .................................... 525/524; 525/934
[58] Field of Search ................................ 525/524, 934

[56] References Cited

U.S. PATENT DOCUMENTS

| | | | |
|---|---|---|---|
| 4,255,553 | 5/1981 | Mizumura et al. | 525/533 |
| 4,421,897 | 12/1983 | Gutekunst et al. | 525/113 |
| 4,920,164 | 4/1990 | Sasaki et al. | 525/396 |

FOREIGN PATENT DOCUMENTS

| | | |
|---|---|---|
| 61-055123 | 3/1986 | Japan . |
| 61-261371 | 11/1986 | Japan . |
| 62-070416 | 3/1987 | Japan . |
| 62-86078 | 4/1987 | Japan . |
| 62-115057 | 5/1987 | Japan . |
| 63-227622 | 9/1988 | Japan . |
| 2300255 | 12/1990 | Japan . |

*Primary Examiner*—John C. Bleutge
*Assistant Examiner*—Randy Gulakowski
*Attorney, Agent, or Firm*—Lorusso & Loud

[57] ABSTRACT

A powder coating composition in which epoxy resin particles and curing agent particles are uniformly distributed is prepared by heating a specific powdery blend of (a) at least one crystalline epoxy resin, (b) at least one crystalline curing agent and (c) at least one non-crystalline epoxy resin and/or at least one non-crystalline curing agent at a specific temperature so that the crystalline particles are bonded with each other with the non-crystalline substance serving as a binder.

4 Claims, No Drawings

PROCESS FOR PREPARING POWDER COATING COMPOSITION

This invention relates to a process for the preparation of an epoxy resin powder coating composition.

Epoxy resin powder compositions have been generally prepared by the dry blending method, melt blending method or press-bonding blending method. In the dry blending method, an epoxy resin powder and a curing agent powder are mixed with each other as such. While the dry blending method is advantageous because the mixing can be easily carried out, this method has a problem because the epoxy resin and the curing agent tend to be separated from each other during transportation or use due to the difference in specific gravity and/or particle size therebetween so that the curing of the powder compositions fails to proceed efficiently.

The melt blending method includes the steps of mixing a melted epoxy resin with a melted curing agent, cooling and solidifying the resulting mixture, and pulverizing the solidified mixture. The melt blending method is free of such a problem of separation of the respective ingredients as seen in the dry blending method. However, another problem is encountered because crystal structures of the epoxy resin and/or the curing agent are destroyed during the melting stage. The presence of crystalline ingredients is highly desired because the composition can exhibits a low viscosity when melted during the curing stage so that it can smoothly penetrate into gaps to be filled therewith for bonding.

The press-bonding blending method is a modification of the above dry blending method and includes the steps of dry-blending epoxy resin powder with curing agent powder, pressing the resulting blend at a high pressure to adhere these ingredients to each other, and pulverizing the pressed blend. Though the resulting composition has a less tendency to cause separation of ingredients as compared with the dry blending method, it still involves such a problem because the adhesion between the ingredients is not sufficiently strong. In order to provide a tight bonding, it is necessary to use an extremely high pressure of more than 100 kg/cm$^2$G in the pressing step. To cope with this problem, the incorporation of stearic acid in the powder blend is proposed. The stearic acid, however, adversely affects the characteristics of the cured body.

It is, therefore, an object of the present invention to provide a simple, economical process which can prepare a powder coating composition free of separation of respective ingredients during storage, transportation or use and having a low viscosity when melted for curing.

In accomplishing the foregoing objects, there is provided in accordance with the present invention a process for the preparation of a powder coating composition, comprising the steps of:

(a) providing a crystalline material consisting of two or more crystalline substances each of which has a melting point of at least 90° C. and one of which has a melting point Mp that is lower than those of the other crystalline substances, said crystalline substances consisting of at least one crystalline epoxy resin and at least one crystalline curing agent;

(b) providing a non-crystalline material consisting of one or more non-crystalline substances each of which has a softening point of at least 50° C. and one of which has a glass transition point Tg which is lower than those of the other non-crystalline substances and which is lower than said melting point Mp, said non-crystalline substances being selected from the group consisting of non-crystalline epoxy resins, non-crystalline curing agents and mixtures thereof;

(c) blending said crystalline material with said non-crystalline material to obtain a mixture having a content of said crystalline material of 55–90% by weight based on the total weight of said crystalline and non-crystalline materials and a content of said at least one crystalline curing agent of 5–45% by weight based on the total weight of said crystalline and non-crystalline materials;

(d) pressing said mixture at a temperature which is higher than said glass transition point Tg but lower than said melting point Mp and which is lower than any softening point of said one or more non-crystalline substances so that said crystalline substances and non-crystalline substances are bonded with each other with said non-crystalline substance having the glass transition point Tg serving as a binder;

(e) then cooling the mixture obtained in step (d) to a temperature lower than said glass transition point Tg; and (f) then pulverizing the cooled mixture obtained in step (e).

In the present specification, "glass transition point" and "melting point" are as measured by means of a differential scanning calorimeter and "softening point" refers to Durran's softening point.

The process according to the present invention uses, as starting materials, (a) a crystalline material which is a mixture of two or more crystalline substances and which consists of at least one crystalline epoxy resin and at least one crystalline curing agent and (b) a non-crystalline material which consists of one or more non-crystalline substances selected from non-crystalline epoxy resins, non-crystalline curing agents and mixtures thereof. Thus, the starting materials include the following combinations (I) through (III):

|      | Crystalline Material (a) | Non-Crystalline Material (b) |
|------|--------------------------|------------------------------|
| (I)  | At least one epoxy resin & at least one curing agent | At least one curing agent |
| (II) | At least one epoxy resin & at least one curing agent | At least one epoxy resin |
| (III)| At least one epoxy resin & at least one curing agent | At least one epoxy resin & at least one curing agent |

It is important that the melting point of each of the crystalline substances constituting the crystalline material (a) should be at least 90° C.

Illustrative of suitable crystalline epoxy resins are as follows:

Triglycidyl isocyanurate (EPIKOTE RXE-15, manufactured by Yuka-Shell Epoxy Inc., Epoxy equivalent: 103, Melting point: 120° C.), Epoxypropoxydimethylbenzylacrylamide (KANE-KARESIN AXE, manufactured by Kanegafuchi Kagaku Industry Inc., Epoxy equivalent: 270, Melting point 100° C.), Hydroquinone diglycidyl ether(HQDGE, manufactured by Nippon Kayaku K. K., Epoxy equivalent: 125, Melting point: 100° C.), Bisphenol S diglycidyl ether (EBPS-200, manufactured by Nippon Kayaku K. K., Epoxy equivalent: 200, Melting point: 125° C.), Tetramethylbisphenol diglycidyl ether (YX-4000, manufactured by Yuka-Shell Epoxy Inc., Epoxy equivalent: 185, Melting point: 105° C.), Modified tetramethylbisphenol diglycidyl ether (YL-6074C, manufactured by Yuka-Shell Epoxy Inc., Epoxy equivalent: 190, Melting point: 93° C.), 2,5-Di-t-butylhydroquinone diglycidyl ether (DTBHQ-EX, manufactured by Yuka-Shell Epoxy Inc., Epoxy equivalent: 202, Melting point: 132° C.), and Terephthalic acid diglycidyl ester.

Illustrative of suitable crystalline curing agents are as follows:

5-(2,5-Dioxotetrahydrofroryl)-3-methyl-3-cyclohexene-1,2-dicarboxylic anhydride (EPIKURON B-4400, manufactured by Dainihon Ink K. K., Melting point: 167° C.), Tetrahydrophthalic anhydride (Melting point: 100° C.), Trimellitic anhydride (Melting point: 167° C.)

Bisphenol A (Melting point: 157° C.),

Bisphenol S (Melting point: 245° C.),

Organic acid hydrizides, and

Dicyanodiamide.

The non-crystalline substances should have softening points at least 50° C., preferably in the range of 50°–150° C., more preferably 50°–130° C. When the softening point of the non-crystalline substances is excessively high, the glass transition point thereof is increased so that it is necessary to use a high pressure during bonding thereof with the crystalline substances. When the softening point of the non-crystalline substances is lower than 50° C., the resulting powder composition tends to cause blocking. The glass transition point of each of the non-crystalline substances constituting the non-crystalline material (b) is preferably in the range of 15°–75° C.

Illustrative of suitable non-crystalline epoxy resins are as follows:

Bisphenol A diglycidyl ether (EPIKOTE 1001, manufactured by Yuka-Shell Epoxy Inc., Epoxy equivalent: 475, Glass transition point: 29° C., Softening point: 68° C.; EPIKOTE 1002, manufactured by Yuka-Shell Epoxy Inc., Epoxy equivalent: 650, Glass transition point: 42° C., Softening point: 83° C.; EPIKOTE 1004, manufactured by Yuka-Shell Epoxy Inc., Epoxy equivalent: 950, Glass transition point: 53° C., Softening point: 98° C.) and o-Cresol novolak epoxy resin (EPIKOTE 180S65, manufactured by Yuka-Shell Epoxy Inc., Epoxy equivalent: 210, Glass transition point: 18° C.; EPIKOTE 180S90, manufactured by Yuka-Shell Epoxy Inc., Epoxy equivalent: 220, Glass transition point: 43° C., Softening point: 90° C.).

Illustrative of suitable non-crystalline curing agents are as follows:

novolak resin (TAMANOL #754, manufactured by Arakawa Kagaku K. K., Glass transition point: 49° C., Softening point: 100° C.), and o-Cresol novolak resin (OCN120, manufactured by Nippon Kayaku K. K., Glass transition point: 70° C., Softening point: 120° C.; OCN90, manufactured by Nippon Kayaku K. K., Glass transition point: 40° C., Softening point: 90° C.).

It is important that the crystalline material (a) and the non-crystalline material (b) should be selected so that the melting point Mp which is the lowest among those of the crystalline substances constituting the crystalline material (a) is higher, preferably by at least 10° C., more preferably by at least 30° C., than the glass transition point Tg which is the lowest among those of the non-crystalline substances constituting the non-crystalline material (b). The non-crystalline substance having the glass transition point Tg serves as a binder for bonding the crystalline and non-crystalline substances.

The crystalline material (a) (i.e. total amount of the crystalline substances) is used in an amount of 55–90% by weight, preferably 60–85% by weight, based on the total weight of the crystalline material (a) and non-crystalline material (b). An amount of the crystalline material (a) below 55% by weight is undesirable because the viscosity of the coating composition when melted is so high that the flowability of the melted mass becomes poor. On the other hand, when the amount of the crystalline material (a) exceeds the above specified 90% by weight upper limit, suitable bonding between the crystalline material (a) and the non-crystalline material (b) cannot be obtained.

The crystalline curing agent (a total amount of crystalline curing agents when two or more crystalline curing agents are used) should be used in an amount of 5–45% by weight, preferably 10–40% by weight, based on the total weight of the crystalline material (a) and the non-crystalline material (b). The crystalline curing agent serves to lower the viscosity of the composition when melted and, thus, to improve the flowability of the molten mass. At least 5% by weight of the crystalline curing agent is necessary to obtain this effect. The upper limit of the crystalline curing agent is determined by the amount of the epoxy resin or resins to be reacted therewith.

It is also preferred that the non-crystalline material (b) contain at least one non-crystalline substance having a glass transition point of less than 50° C. and that such a non-crystalline substance or substances with a glass transition point of less than 50° C. be used in an amount of 5–40% by weight, preferably 5–30% by weight, based on the total weight of the crystalline and non-crystalline materials (a) and (b).

If desired, a liquid epoxy resin such as bisphenol A diglycidyl ether (EPIKOTE 828, manufactured by Yuka-Shell Epoxy Inc., Epoxy equivalent: 190) may be incorporated into the powder coating composition.

The curing agent (total of the crystalline and non-crystalline curing agent) is used in an amount of 0.5–1.5 equivalents, preferably 0.7–1.2 equivalents of the functional group thereof per one equivalent of the epoxy group present in the coating composition.

Various additives such as a curing accelerator, a reactive organic solid material, a colorant, a flame retarder, a leveling agent, a flow rate controlling agent and a filler may be incorporated into the powder coating composition. These additives may be crystalline or non-crystalline.

Illustrative of suitable curing accelerators are as follows:

Imidazole imidazole (CUREZOL 2MZ, manufactured by Shikoku Kasei Inc., Melting point: 147° C.);

Modified imidazole (CUREZOL 2MZ-AZINE, manufactured by Shikoku Kasei Inc., Melting point: 248° C.);

Prepolymer obtained by reaction of an epoxy resin with an imidazole compound (EPICURE P-200, manufactured by Yuka-Shell Epoxy Inc., Glass transition point: 95° C.); Triphenylphosphine, and Phenol novolak resin salt of diazabicycloundecene (U-Cat831, manufactured by San Apro Inc.).

The curing accelerator is used in an amount of 0.1–5 parts by weight, preferably 0.3–3 parts by weight, per 100 parts by weight of the epoxy resin present in the powder coating composition.

The reactive organic solid is a substance capable of reacting with an epoxy resin during the curing stage of the powder coating composition. Illustrative of suitable reactive organic solids are as follows:

Bismaleimide-triazine resin (BT-2170, manufactured by Mitsubishi Gas Chemical Inc., Glass transition point: 42° C.), effective to improve thermal resistance of the cured body, Bismaleimide resin (MB-3000, manufactured by Mitsubishi Yuka K. K., Melting point: 156° C.), effective to lower the viscosity of the composition when melted and to improve thermal resistance of the cured body, Butyral resin (S-LEC BLS, manufactured by Sekisui Kagaku K. K., Glass transition point: 120° C.), effective to improve adhesion strength of the composition, and Solid polyol such as tris(2-hydroxyethyl)isocyanurate (THEIC, manufactured by Shikoku Kasei Inc., Melting point: 135° C.), effective to improve thermal resistance and flexibility of the cured body.

The reactive organic solid is used in an amount of 10–50 parts by weight, preferably 20–40 parts by weight per 100 parts by weight of the epoxy resin present in the powder coating composition.

An example of the leveling agent is an acrylate oligomer (NIKALITE XK-21, manufactured by Nihon Carbide Inc.).

Preferably, each of the crystalline and non-crystalline substances and other additives to be used as starting materials for the preparation of a powder coating composition has an average particle size of 10–150 μm, more preferably 10–100 μm.

In the process according to the present invention, the above crystalline and non-crystalline materials and, if necessary, additives are first mixed in a dry state. When two or more non-crystalline substances are used as the non-crystalline substance (b), it is preferred that these substances be previously melt-blended with each other for reasons of improved uniformity. Thus, these substances are melted and mixed with each other, and the mixture is cooled for solidification and pulverized. The pulverized mixture is then used as a raw material for the preparation of the powder coating composition.

The resulting mixture is then pressed at a temperature which is higher than the glass transition point Tg of the non-crystalline substance but lower than the melting point Mp of the crystalline substance and which is lower than any softening point of the non-crystalline substances, so that the non-crystalline substance having the glass transition point Tg becomes sticky and is adhered to the particles of the crystalline substances.

The pressure at which the bonding is carried out is preferably 20–100 kg/cm$^2$, more preferably 25–80 kg/cm$^2$. The press-bonding can be effected by means of heated pressure rolls or pressing plates.

The mixture heated to a temperature higher than Tg is then cooled to a temperature lower than Tg and solidified. The solidified mixture is pulverized and, if desired, sieved to form a powder coating composition having an average particle size of generally 50–1000 μm, preferably 60–800 μm.

Since the non-crystalline substance or substances are firmly bonded to the crystalline substance or substances, they are not separated from each other during pulverization and subsequent transportation, storage and use. Further, since, in the pressing step, the crystalline material (a) and non-crystalline material (b) are not heated at temperatures above the melting point and softening point, respectively, neither adhesion of the raw materials on the operating surfaces of the pressure rolls or pressure plates nor reaction of the epoxy resin and curing agent takes place. In addition, since the coating composition contains a relatively large amount of particles of crystalline substance, the coating composition shows a low viscosity of, for example, less than 8000 cP when melted during the curing stage. The coating composition may be suitably utilized for the fluidized bed coating, electrostatic coating or spray coating of articles or as a powder vanish for impregnation.

The following examples will further illustrate the present invention. Parts are by weight.

EXAMPLE

The raw materials shown in Table 1 were blended in the amounts shown in Table 1 and the resulting blends were pulverized to a particle size of 100 mesh (Tyler) or smaller. Each of the pulverized mixtures was then pressed using press rolls at a temperature and a pressure as shown in Table 1 and thereafter pulverized to a particle size of 200 mesh or smaller to obtain a powder composition. In Table 1, the Trade Marks or abbreviations for the raw materials are as follows:

Crystalline Epoxy Resin

YX4000: Tetramethylbisphenol diglycidyl ether, Melting point: 105° C., manufactured by Yuka-Shell Epoxy Inc.

Non-Crystalline Epoxy Resin

EPIKOTE 180S65: o-Cresol novolak epoxy resin, manufactured by Yuka-Shell Epoxy Inc., Epoxy equivalent: 210, Glass transition point: 18° C., Softening point: 65 ° C;

EPIKOTE 180S90: o-Cresol novolak epoxy resin, manufactured by Yuka-Shell Epoxy Inc., Epoxy equivalent: 220, Glass transition point: 43° C., Softening point: 90° C.;

EPIKOTE 1001: Bisphenol A diglycidyl ether, manufactured by Yuka-Shell Epoxy Inc., Epoxy equivalent: 475, Glass transition point: 29° C., Softening point: 68° C.;

EPIKOTE 1002: Bisphenol A diglycidyl ether, manufactured by Yuka-Shell Epoxy Inc., Epoxy equivalent: 650, Glass transition point: 42° C., Softening point: 83° C.;

EPIKOTE 1004: Bisphenol A diglycidyl ether, manufactured by Yuka-Shell Epoxy Inc., Epoxy equivalent: 950, Glass transition point: 53° C., Softening point: 98° C.

Crystalline Curing Agent

BA: Bisphenol A, Melting point: 157° C.

EPIKURON B-4400: 5-(2,5-dioxotetrahydrofroryl)-3-methyl-3-cyclohexene-1,2-dicarboxylic anhydride, manufactured by Dainihon Ink K. K., Melting point: 167° C.

TMA: Trimellitic anhydride (Melting point: 167° C.)

TABLE 1

| | \multicolumn{9}{c}{Sample No.} |
|---|---|---|---|---|---|---|---|---|---|
| | 1 | 2 | 3 | 4 | 5 | 6 | 7* | 8* | 9* |
| Raw Materials | | | | | | | | | |
| Crystalline epoxy resin YX4000 | 60 | 80 | 90 | 60 | 80 | 75 | 80 | 100 | 50 |
| Non-crystalline epoxy resin | | | | | | | | | |
| EPIKOTE 180S65 | — | 20 | — | 20 | — | 25 | — | — | 20 |
| EPIKOTE 180S90 | 20 | — | — | — | — | — | — | — | — |
| EPIKOTE 1002 | 20 | — | 10 | 20 | 10 | — | — | — | — |
| EPIKOTE 1004 | — | — | — | — | 10 | — | 20 | — | 30 |
| Crystalline curing agent | | | | | | | | | |
| BA | 20 | 10 | 20 | 38 | 28 | 34 | — | — | 10 |
| EPIKURON B-4400 | 10 | 10 | 11 | 13 | — | 27 | — | 61 | 10 |
| TMA | — | — | — | — | 15 | — | — | — | — |
| Non-crystalline curing agent | | | | | | | | | |
| OCN90 | — | 36 | — | — | 10 | — | 20 | — | 23 |
| OCN120 | 21 | — | 21 | — | — | — | 29 | — | — |
| Curing accelerator EPICURE P-200 | 1.5 | 1.5 | 1.5 | 1.5 | 1.5 | 1.5 | 1.5 | 1.5 | 1.5 |
| Content of Crystalline Material (wt %) | 59.6 | 64.1 | 79.6 | 73.5 | 80.3 | 84.4 | 53.7 | 100 | 49.0 |
| Content of Crystalline Curing Agent (wt %) | 19.9 | 12.8 | 20.4 | 33.7 | 28.1 | 37.9 | 0.0 | 37.9 | 14.0 |
| Pressing Stage | | | | | | | | | |
| Temperature (°C.) | 45 | 30 | 45 | 30 | 45 | 30 | 55 | 55 | 30 |
| Pressure (Kg/cm$^2$) | 35 | 35 | 35 | 35 | 35 | 35 | 35 | 35 | 35 |
| Flow Rate | 27.1 | 25.0 | 34.5 | 44.0 | 24.3 | 47.4 | 18.5 | 50< | 13.8 |
| Inter-Particle Bonding | 3.0 | 2.3 | 3.5 | 3.8 | 3.0 | 3.3 | 1.5 | 4.9 | 2.5 |

*Comparative Sample

OCN90: o-Cresol novolak resin, Glass transition point: 40° C., Softening point: 90° C., manufactured by Nippon Kayaku K. K.

OCN120: o-Cresol novolak resin, Glass transition point: 70° C., Softening point: 120° C., manufactured by Nippon Kayaku K. K.

Curing Accelerator

EPICURE P-200: Bisphenol A epoxy resin-adduct of imadazole, manufactured by Yuka-Shell Epoxy Inc.

Each of the powder compositions was tested for flow rate and inter-particle bonding in the following manner.

Flow Rate

A sample composition (0.5 g) is formed into a tablet with a diameter of 13 mm under a pressure of 10 kgf/cm$^2$. The tablet is placed on an iron plate, which has been preheated to 150° C. and inclined at an angle of 10°, and heated at 150° C. for 20 minutes to permit the tablet to melt and flow thereon. The distance (L) through which the melted composition flowed is measured. Flow rate is defined as follows:

$$\text{Flow rate} = (L - 13)/D$$

wherein L is the length (mm) of the melt-flowed sample and D is the thickness (mm) of the tablet. A flow rate of 20 or more is regarded as being good.

Inter-Particle Bonding:

A sample composition is sieved to obtain a fraction which is smaller smaller than 20 mesh but is large than 50 mesh. The fraction (50 g) is placed on a vibration sieve of 150 mesh and vibrated for 30 minutes. Then, the amount of the mass passed through the 150 mesh sieve during the 30 minutes vibration is measured. An amount of the 150 mesh-pass smaller than 4% by weight is regarded as being excellent in bonding between ingredients forming the particles of the powder composition.

What is claimed is:

1. A process for the preparation of a powder coating composition, comprising the steps of:

(a) providing a crystalline material consisting of two or more crystalline substances each of which has a melting point of at least 90° C. and one of which has a melting point Mp that is lower than those of the other crystalline substances, said crystalline substances consisting of at least one crystalline epoxy resin and at least one crystalline curing agent;

(b) providing a non-crystalline material consisting of one or more non-crystalline substances each of which has a softening point of at least 50° C. and one of which has a glass transition point Tg which is lower than those of the other non-crystalline substances and which is lower than said melting point Mp, said non-crystalline substances being selected from the group consisting of non-crystalline epoxy resins, non-crystalline curing agents and mixtures thereof;

(c) blending said crystalline material with said non-crystalline material to obtain a mixture having a content of said crystalline material of 55–90% by weight based on the total weight of said crystalline and non-crystalline materials and 5–45% by weight of said at least one crystalline curing agent based on the total weight of said crystalline and non-crystalline materials;

(d) pressing said mixture at a temperature which is higher than said glass transition point Tg but lower than said melting point Mp and which is lower than any softening point of said one or more non-crystalline substances so that said crystalline substances and non-crystalline substances are bonded with each other with said non-crystalline substance having the glass transition point Tg serving as a binder;

(e) then cooling the mixture obtained in step (d) to a temperature lower than said glass transition point Tg; and (f) then pulverizing the cooled mixture obtained in step (e).

2. A process according to claim 1, wherein step (c) includes blending a curing accelerator with said crystalline and non-crystalline materials so that said mixture further contains the curing accelerator.

3. A process according to claim 1, wherein said non-crystalline material contains at least one non-crystalline substance with a glass transition point of less than 50° C. in an amount of of 5-40% by weight based on the total weight of said crystalline and non-crystalline materials.

4. A process according to claim 1, wherein said mixture is pressed at a pressure of 20-100 kg/cm$^2$ in step (d).

* * * * *